United States Patent [19]

Chang et al.

[11] Patent Number: 4,947,367
[45] Date of Patent: Aug. 7, 1990

[54] SYSTEM FOR CONVERTING DIGITAL DATA FROM MAGNETIC TAPE FORMAT APPARATUS AND METHOD FOR CONVERTING A SEQUENTIALLY ACCESSIBLE MAGNETIC TAPE DATA FORMAT TO DIRECTLY ACCESSIBLE WRITE-ONCE DISK DATA FORMAT TO WORM OPTICAL DISK FORMAT

[75] Inventors: Christopher Y. Chang, Medfield; Leo C. Sherwin, Marlboro, both of Mass.

[73] Assignee: EMC Corporation, Hopkington, Mass.

[21] Appl. No.: 173,981

[22] Filed: Mar. 28, 1988

[51] Int. Cl.$^5$ .............. G06F 7/22; G06F 7/24; G06F 3/06; G06E 1/02
[52] U.S. Cl. ............ 364/900; 364/927.81; 364/939.2; 364/952.1; 364/952.31; 364/952.6; 364/960; 364/963.5
[58] Field of Search ............ 360/40, 39, 48, 72.2, 360/15, 32; 364/200 MS File, 900 MS File

[56] References Cited

U.S. PATENT DOCUMENTS

| | | | |
|---|---|---|---|
| 3,573,744 | 4/1971 | Rigazio | 364/200 |
| 4,000,510 | 12/1976 | Cheney et al. | 360/33 |
| 4,084,231 | 4/1978 | Cappozzi et al. | 364/200 |
| 4,089,028 | 5/1978 | Wells | 360/79 |
| 4,229,808 | 10/1980 | Hui | 365/234 |
| 4,238,843 | 12/1980 | Carasso et al. | 365/234 |
| 4,321,635 | 3/1982 | Tsuyuguchi | 360/72.2 |
| 4,321,670 | 3/1982 | Timmons | 364/300 |
| 4,355,338 | 10/1982 | Yamamoto et al. | 360/15 |
| 4,467,421 | 8/1984 | White | 364/200 |
| 4,511,963 | 4/1985 | Kantner | 364/200 |
| 4,541,019 | 9/1985 | Precourt | 360/15 |
| 4,575,827 | 3/1986 | Kulakowski | 365/230 |
| 4,578,722 | 3/1986 | Lovgren et al. | 360/60 |
| 4,701,846 | 10/1972 | Zenzelfilis | 178/6.6 |
| 4,727,512 | 2/1988 | Birkner et al. | 364/900 |
| 4,775,969 | 10/1988 | Osterlund | 369/53 |

OTHER PUBLICATIONS

"IBM DOS Version 3.10 Reference Manual", 2/85, pp. 7-19 to 7-23 and 7-157 to 7-160.
Haim Brill, "Optical Storage System Emulates Formatted Tape Drive", *Hard Copy,* Apr '87, pp. 104-106, 108.
"Optimem 1000 OEM Manual", revision 4, Apr. 1985.

*Primary Examiner*—Archie E. Williams, Jr.
*Assistant Examiner*—Ayni Mohamed
*Attorney, Agent, or Firm*—Weingarten, Schurgin, Gagnebin & Hayes

[57] ABSTRACT

Apparatus and method for storing magnetic tape format data separately stores the tape data from the tape-related information, such as file markers and interblock gap signals. The data and data-related signals are stored in separate finite length buffer memories, which when filled to a predetermined capacity are transferred to a write-once read-many (WORM) optical disk, and stored in contiguous locations beginning at one end of the addressable space on the optical disk. A separately generated tape record map list, including the WORM optical disk address of the aforementioned tape data and tape-related signals is created and stored on the optical disk in sequentially contiguous locations corresponding to sequential tape reel numbers beginning at the opposite end of the addressable space on the optical disk. The data thus recorded on the WORM optical disk is recoverable in the original magnetic tape format by recomposing the data stored in the WORM optical disk in the original magnetic tape data format. Furthermore, the conversion of data according to the present invention can be adapted to a variety of other formats to be stored to and recovered from the WORM optical disk format.

10 Claims, 6 Drawing Sheets

| TRM BLK ADDRESS | —102 |
| ≈ TRM BLK ADDRESS | ≈—104 |
| ∅ | —106 |
| PRES. DISC VOLUME | —110 |
| POST DISC VOLUME | —112 |
| ∅ | —114 |
| TRM BLK ADDRESS | —116 |
| TRM BLK ADDRESS | —118 |

| RECORD BLK ADDRESS | —122 |
| OFFSET VALUE | —124 |
| CONTIG BYTE CNT. | —126 |
| DISC ID | —128 |
| RECORD SIZE | —130 |

| ∅ | —144 |
| F.M. CODE | —142 |
| ∅ | —146 |

| ∅ | —151 |
| IBG CODE | —152 |
| OLD LENGTH | —153 |
| NEW LENGTH | —154 |
| IBG CODE | —155 |
| ∅ | —156 |

| ∅ | —161 |
| BLOCK RELOC. CODE | —162 |
| LAST BLK ADDRESS | —163 |
| NEXT BLK ADDRESS | —164 |
| LAST OFFSET | —165 |
| NEXT OFFSET | —166 |
| PREV BYTE CNT. | —167 |
| NEXT BYTE CNT. | —168 |
| LAST DISC ID | —169 |
| NEXT DISC ID | —170 |
| BLOCK RELOCATION CODE | —171 |
| ∅ | —172 |

| ∅ | —181 |
| CORRUPT CODE | —182 |
| SIZE OF CORR. CODE | —183 |
| SIZE OF GOOD DATA | —184 |
| CORRUPT CODE | —185 |
| ∅ | —186 |

| ∅ | —191 |
| ERASE CODE | —192 |
| SIZE OF ERASE | —193 |
| ERASE CODE | —194 |
| ∅ | —195 |

SYSTEM FOR CONVERTING DIGITAL DATA FROM MAGNETIC TAPE FORMAT APPARATUS AND METHOD FOR CONVERTING A SEQUENTIALLY ACCESSIBLE MAGNETIC TAPE DATA FORMAT TO DIRECTLY ACCESSIBLE WRITE-ONCE DISK DATA FORMAT TO WORM OPTICAL DISK FORMAT

FIELD OF THE INVENTION

The present invention relates to data conversion methods and apparatus and, in particular, to methods and apparatus for converting data from a magnetic tape format to the optical disk format.

BACKGROUND OF THE INVENTION

The write-once read-many (WORM) optical disk, having storage capacities in the order of gigabytes, offers a high storage capacity medium which provides ideal archival storage. Previously used archival storage media, such as magnetic tape medium allowed the system to erase or otherwise modify the data previously stored on the tape medium. However, the non-erasable nature of the WORM optical disk creates a basic incompatibility with the erasable characteristic of the magnetic tape, or other similar erasable medium. Therefore, the software operating system which must transfer information to and receive information from the archival storage medium must be significantly modified to incorporate the non-erasable WORM optical disk in place of an erasable storage medium. However, in view of technical or economical factors, the adaptation of existing operating systems to accommodate the new WORM storage media may not be practical without replacing either or both system hardware and software. Therefore, due to technical and economic constraints existing systems typically could not incorporate the advantages offered by the higher storage capacity WORM optical disk system.

SUMMARY OF THE INVENTION

The apparatus and method according to the present invention, when connected to a computer system or an existing magnetic tape drive, permits the data, in magnetic tape data format, to be stored on the WORM optical disk system without imposing any hardware or software modifications in the systems to which it is attached. The disclosed apparatus responds to host computer systems as would a conventional 7- or 9-track magnetic tape drive. The data stored in and read from the WORM optical disk as seen by the host computer is in the same format as magnetic tape data. Data from the host is received in the magnetic tape format and is stored in a data buffer having a finite length, typically 128K bytes. The non-data, related information, such as file marks, interblock gaps and block length information, is separately stored in an associated buffer and formatted to form a tape record map (TRM), whereupon it too is stored, typically interspersed between with 32 megabyte long blocks of the data from the 128K byte data buffer to the WORM optical disk. The TRM and data information is stored on the WORM disk beginning at the innermost end of the addressable space on the WORM optical disk storage medium. Furthermore, a tape record map list (TRML) is created, specifying the addresses of the TRM stored on the optical disk, and beginning at the outer end of the space addressable on the WORM optical disk. Data stored on the WORM may be read from the WORM disk and reformatted into the magnetic tape data format by reversing the above-described process perfectly.

BRIEF DESCRIPTION OF THE DRAWING

These and other features will be better understood from the following detailed description, taken together with the drawing, wherein.

DETAILED DESCRIPTION OF THE INVENTION

Figure 1:
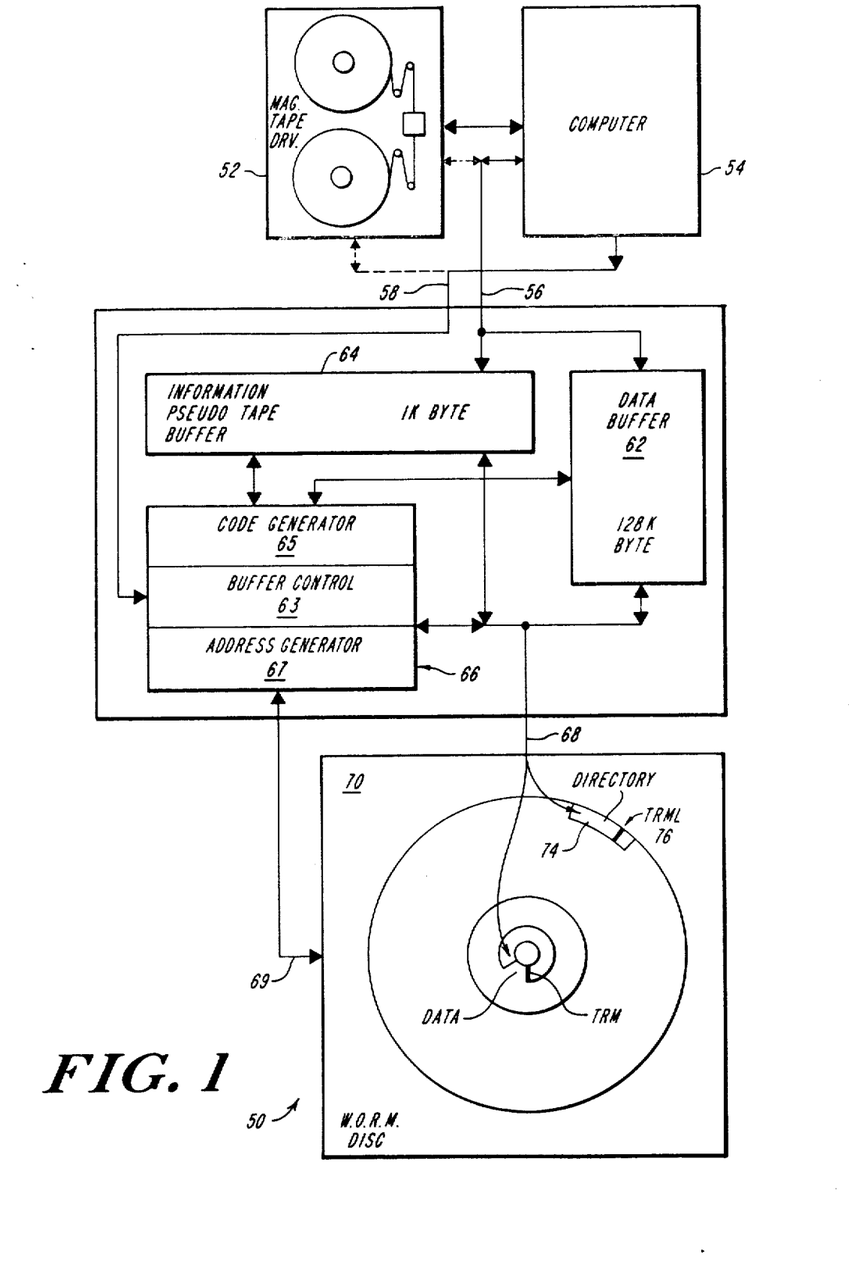
FIG. 1 is a block diagram of one embodiment of the present invention.
Figure 12:
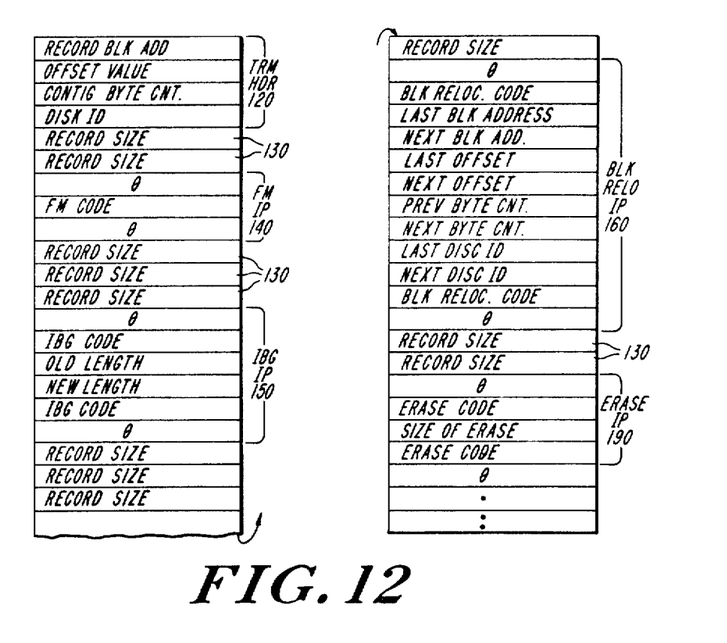
FIG. 12 is a fourth illustration of a TRM in accordance with the present invention.
Figure 13:
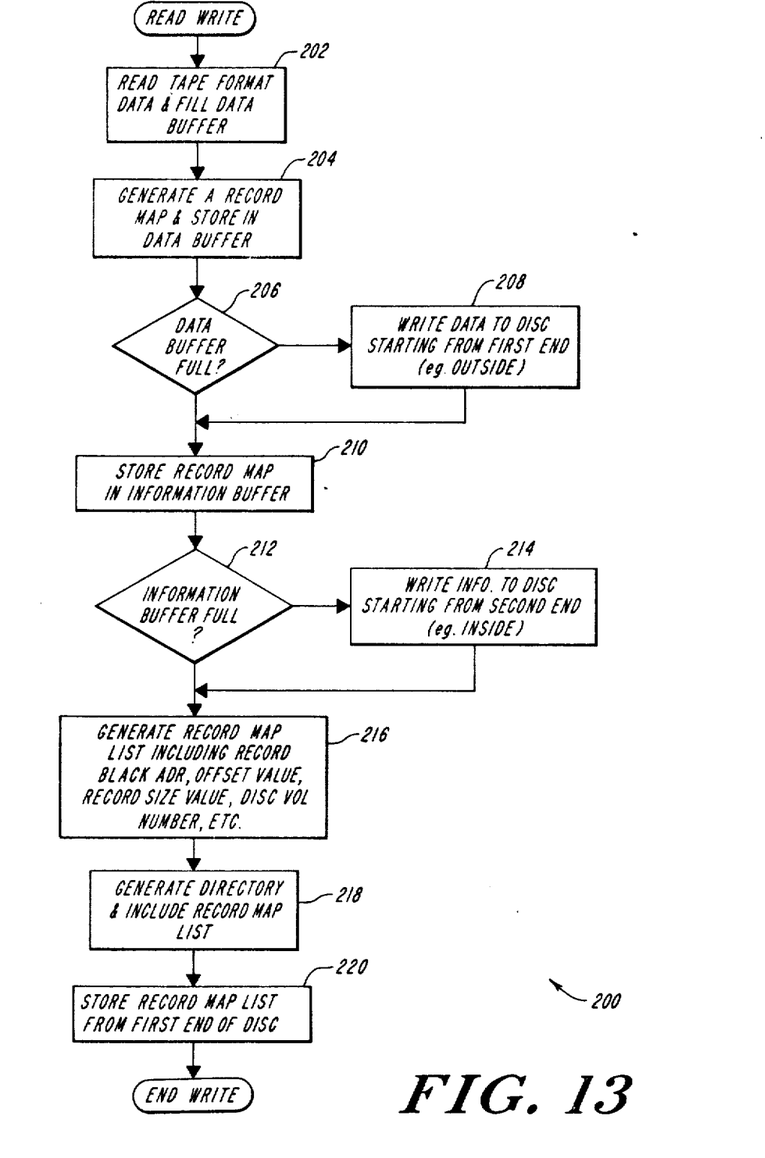
FIG. 13 is a flow chart of one embodiment of the disc write process according to the present invention.

The block diagram 50 of one embodiment of the present invention is shown in FIG. 1 and generally operable to the flow chart 200 of FIG. 13, wherein the magnetic tape format data is provided by a magnetic tape drive 52 or by a host computer system 54 at step 202. The magnetic tape drive is typically known in the computer art as a nine or seven track unit such as models TU-80 manufactured by DEC. The information in the magnetic tape format is transmitted by the host computer 54 over signal leads 56 and is received by a data buffer 62, having a predetermined capacity selected in the present embodiment to be 128 kilobytes. The information in the magnetic tape format includes data and non-data information, such as a file mark (FM), inter-block gap (IBG) having a specific gap length and record size information and including specific coding of the information, such as file marker (FM) codes as illustrated by FIGS. 3-8, which are assembled to form a tape record map (TRM) illustrated in FIGS. 9-12, at step 204. The TRM information is stored and forms a "pseudotape" in the buffer 64 which, in the present invention, has a capacity of 1 kilobyte. The storage capacities of the data buffer 62. The data stored may comprise a block length of 128 kilobytes (128K bytes)

and the related non-data information stored in the "pseudotape" buffer 64 may comprise from 2 to 22 bytes of information, as illustrated by FIGS. 3 through 8, such that a TRM created in the buffer 64 (at step 204) corresponding to a particular block of data in the data buffer 62 will be less than 100 bytes. As succeeding blocks of data are transferred from the magnetic tape drive 52 or the computer 54 to the data buffer 62, the data buffer 62 and the pseudotape buffer 64 begin to fill up, eventually reaching their respective maximum capacity as determined at steps 206 and 212. When each reaches its capacity, the reformatter controller 66 causes the data to be transferred from either the data buffer 62 (at step 208) or the pseudotape buffer 64 (at step 214) to a write-once read-many (WORM) optical disk drive 70 on data path 68. Data from the data buffer 62 and pseudotape buffer 64 are contiguously and sequentially stored by the WORM disk drive 70 on a WORM disk 72, beginning at the first free (unwritten) data location on inside end of the sequentially accessed data area. Thus, on the WORM disk 72 the 1K blocks of data from the pseudotape buffer are interspersed among the larger, 128K blocks of data from the data buffer 62. The WORM drive 70 in the present embodiment is a model 1000 manufactured by Optimem, Sunnyvale, Calif., wherein the related manufacturers' information is incorporated herein by reference.

Figure 2:
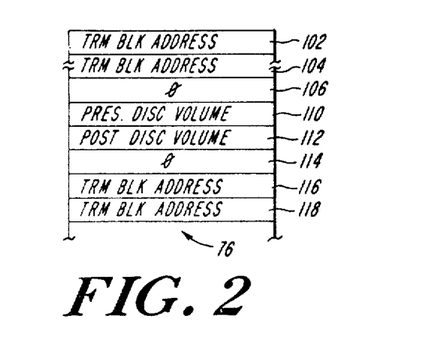
FIG. 2 is a block diagram of one embodiment of a tape record map list.

Each side of the optical disk 72 typically has storage capacity equal to many reels of magnetic tape. A directory including identifiers for each tape (reel) stored in the WORM disk 72 is provided for each "volume" or reel in a sequentially written directory 74 and identifiers are stored contiguously (step 220) at the opposite end, in this instance the outer edge of the WORM disk, beginning with the first free (unwritten) location. Stored within each directory, provided at step 218, is a tape record map list (TRML) 76 created by the reformatter controller 66 previously generated at step 216, which provides the WORM address of the stored TRM(s) relative to that "reel" of tape. A typical TRML is illustrated in FIG. 2 and discussed in more detail below.

Concurrent with the transfer of data on data leads 56, control signals on lead 58 are provided to the controller 66 which controls the data transfers to and from buffer 62 and 64 as well as generating specific data-related codes stored in the Pseudotape buffer 64, illustrated by FIGS. 3-8 from the magnetic tape drive commands illustrated by Table 1 below. The commands are illustrative of typical magnetic tape drive 52 commands. A typical magnetic tape drive comprises a DEC model TU-80, whose related manufacturers' information is incorporated herein by reference.

TABLE 1

| COMMAND | LOOP | REV | WRT | WFM | ERASE |
|---|---|---|---|---|---|
| Read Forward* | L | L | L | L | L |
| Read Reverse* | L | H | L | L | L |
| Write* | L | L | H | L | L |
| Write File Mark | L | L | H | H | L |
| Erase (Variable) | L | L | H | L | H |
| Erase (Fixed) | L | L | H | H | H |
| Data Security Erase | H | L | H | H | H |
| Space Forward | L | L | L | L | H |
| Space Reverse | L | H | L | L | H |
| Controlld Backspace | L | H | H | L | H |
| File Search Forward | L | L | L | H | L |
| File Search Reverse | L | H | L | H | L |
| File Search Forward (Ignore Data) | L | L | L | H | H |
| File Search Reverse (Ignore Data) | L | H | L | H | H |

TABLE 1-continued

| COMMAND | LOOP | REV | WRT | WFM | ERASE |
|---|---|---|---|---|---|
| Read Sense | H | H | L | L | H |
| Data Loopback | H | H | H | H | H |

L = Low = False
H = High = True
*FLGAP is also strobed during these command transfers, indicating the setting of a Long Gap Length The reformattor controller 66 code generator 65 generates the codes illustrated in FIGS. 3-8, the address generator 67 generates the above-mentioned TRML and the buffer control 63 providing WORM disk drive 70 control signals, illustrated below in Table 2, representing the command signals on signal paths 69 for a model 1000 WORM disk, drive manufactured by Optimem, wherein the related manufacturer's information is incorporated by reference.

TABLE 2

| BYTE | BIT | | | | | | | |
|---|---|---|---|---|---|---|---|---|
| | 7 | 6 | 5 | 4 | 3 | 2 | 1 | 0 |
| 0 | Operation Code | | | | | | | |
| 1 | Logical Unit Number | | | RESERVED | | | | |
| 2 | Logical Block Address if required (MSB) | | | | | | | |
| 3 | Logical Block Address if required | | | | | | | |
| 4 | Logical Block Address if required | | | | | | | |
| 5 | Logical Block Address if required (LSB) | | | | | | | |
| 6 | RESERVED | | | | | | | |
| 7 | Transfer Length if required (MSB) | | | | | | | |
| 8 | Transfer Length if required (LSB) | | | | | | | |
| 9 | Control Byte | | | | | | | |

Figure 14:
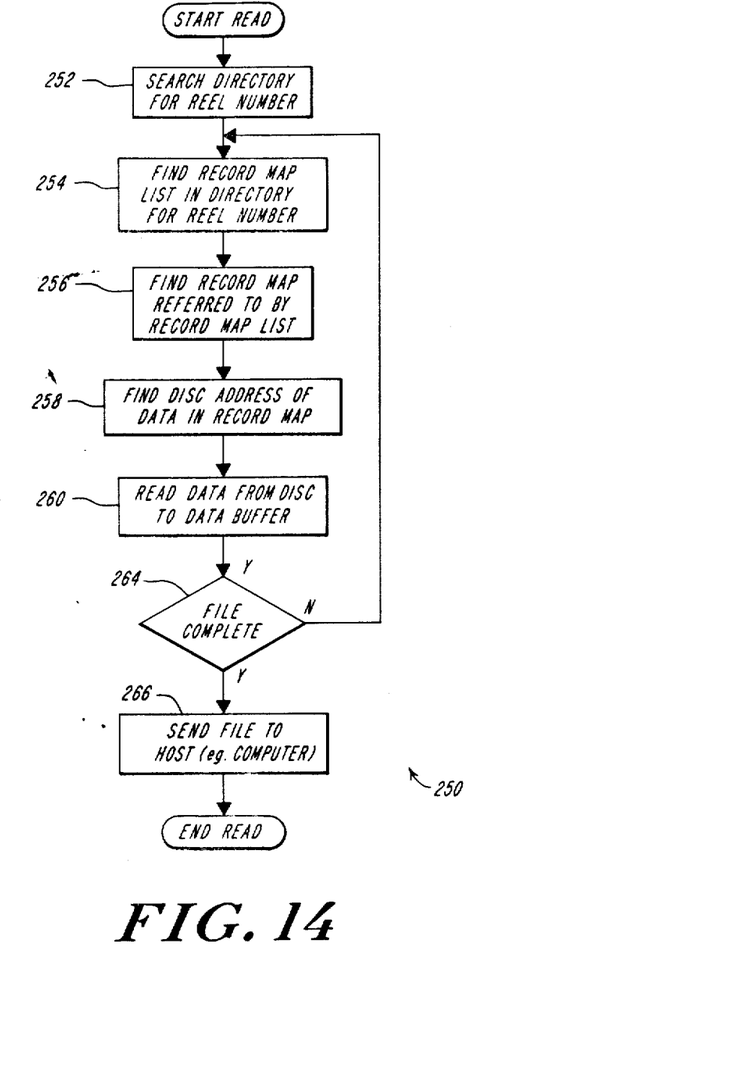
FIG. 14 is a flow chart of one embodiment of the disc read process according to the present invention.

As illustrated in the flow chart 250 of FIG. 14, data stored on disk 72 is returned at step 266 to the host computer 54 or magnetic tape drive in the magnetic tape data format as follows. The computer 54 sends a reel number request which is received by the reformatter controller 66, which in turn searches at step 252 for a disk directory corresponding to the reel number. The search occurs by sequentially reading the directory from the directory end (outer edge) backwards until the last written directory is found, and then reading in the opposite direction to find the last directory code corresponding to the selected reel number. According to the present invention, reels of data which have been erased, rewritten or otherwise modified have been assigned a new reel directory which is written, in sequence, after any previous directory (the original modified reel). Therefore, the reformatter controller 66 will only read true (last) copy of the reel in the directory. The previous directories (for the same reel) are regarded as having been "erased."

Having located the directory corresponding to the requested reel of data, the TRML, illustrated in FIG. 2, is then located at step 254, which provides the optical disk address of the TRM block at step 256. Since the TRM information is stored on the disk 72 as the pseudotape buffer 64 fills to its capacity (1K byte), there may be several blocks of TRM stored on the disk 72 for a particular reel at step 264. Therefore, the TRML 76 provides a sequence of addresses for each respective TRM. Two exemplary TRM block addresses are herein illustrated as addresses 102 and 104, and again at the opposite end of the TRML as blocks 116 and 118, wherein each comprise two bytes of data wherein one byte is non-zero. Also present on the TRML 76 is the present disk volume number 110 and the next disk volume 112, relating to a reel of data which may be partially stored on one disk and partially stored on a second (subsequent) disk. Separating the disk volume number and the TRM block address are markers 106 and 114, each comprising two bytes of information having a numeric value of zero. According to the Present invention, except for the markers such as 106 and 114, and later with regard to the TRM information of FIGS. 3-8, there exists no address of code information comprising two contiguous bytes having a value of zero.

Having recovered the TRM address from the TRML 76, the information of the TRM is recovered and is accessed as a pseudotape without actual data according to the instructions of Table 1 from the computer 54. The data will be retrieved from the disk 72 at step 256, 258 and 260, when it is required, according to the disk block address stored in TRM.

As discussed above, the data received from the magnetic tape drive 52 or computer 54 in the magnetic tape data format is initially stored in a 128K byte data buffer 62. The reformatter controller 66 constantly reviews the status of the data buffer 62. When either one of the following conditions occurs, the reformatter empties the data buffer to the disk 72.

Condition 1. There are less than 64K bytes of space left in the buffer.

Condition 2. The size of the accummulated data is greater than 1K and the number of accumulated records is more than 1.

When the external control signals on signal path 58 comprise tape write commands from the host computer 54 or the magnetic tape drive 52, the pseudotape buffer 64 is created by reformatter controller 66 utilizing the TRM data information packets discussed in detail with respect to FIGS. 3-8 below. In particular, the non-data information relating to the magnetic tape format includes the control illustrated by Table 1, as well as additional information such as erroneous, or corrupt, data, erased and relocated data is reflected by specific information sequences which are stored in the TRM. The encoded information of FIGS. 3-8, referred to as information packets (IP), comprise a particular sequence of codes, each comprising two bytes in the present embodiment although alternate embodiments may adopt a different data structure. Furthermore, according to the present invention, all recorded information, except for particular markers indicated as "∅" have a nonzero value. Otherwise, a data segment indicated as "∅" comprise two bytes, each having a binary value of zero. All information packets (IP), except TRM header, have symmetrical structure to allow the pseudotape being accessed from both directions.

Figure 3:
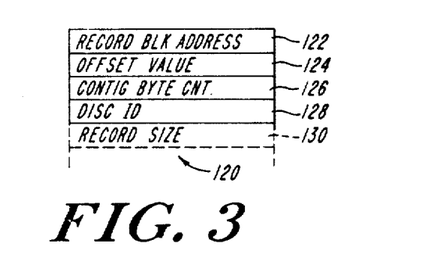
FIG. 3 is a block diagram of one embodiment of a tape record map header information packet (IP) according to the embodiment of FIG. 1.

Each TRM stored includes a TRM header 120, shown in FIG. 3, which provides information for locating the first record mapped by the TRM within a 128K byte block stored on the disk 72. Included is a record block address 122, the offset of the record block within the block 124, a contiguous byte count 126, indicating the number of contiguous bytes in the record block and a disk volume I.D. 128. The contiguous byte count field facilitates the data retrieval process. One or more two byte record entries 130 follow the TRM header which indicate the size of the record data block transferred by the host computer (in magnetic tape format). The number of records stored in the record size entry fields correspond to the actual record size minus one, e.g., an actual record size of 1024 will be stored as 1023. Each data block is locatable on the disk by an address stored in the TRML 76.

Figure 4:
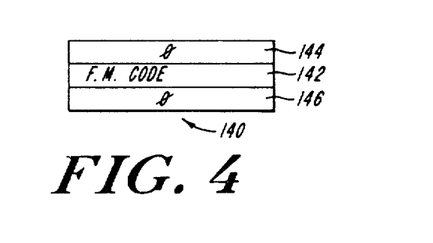
FIG. 4 is a block diagram of one embodiment of a file mark IP in accordance with the present invention.
Figure 5:
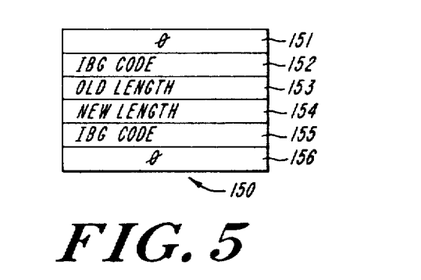
FIG. 5 is a block diagram of one embodiment of an inter-block gap IP in accordance with the present invention.

The magnetic tape data format command indicated as write file mark translates into the information packet 140 of FIG. 4. The information packet 140 comprises a selected two-byte file marker code 142 separated from adjoining information packets with zero markers 144 and 126.

The write command listed in the magnetic tape format command list of Table 1 corresponds to the storage of data on a magnetic tape after a selected inter-block gap (IBG) which indicates the end of one data block and the beginning of another data block on the magnetic tape. The inter-block gap and the particular length of the inter-block gap represents non-data related information which is stored as a separate information packet illustrated in FIG. 5, which begins and ends with the zero markers 151 and 155. A selected IBG code 152 indicates that the information package 150 of FIG. 5 corresponds to the inter-block gap. The information packet 150 also provides the indication of a change in inter-block length, wherein the old length is specified by marker 153 and the new length is specified by marker 154. The IBG code 151 is repeated at 155 adjacent to the zero marker 156.

Figure 6:
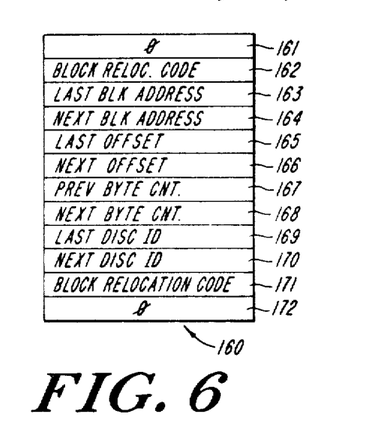
FIG. 6 is a block diagram of one embodiment of a data block relocation IP in accordance with the present invention.

When a bad disk block is encountered on the optical disk 72 as signalled to the reformatter controller 66 according to control signals 69 provided by the WORM drive 70, the data (a part of the 128K transfer from data buffer 62) is relocated, and indicated by a block relocation information packet (IP) 160 shown in FIG. 6. The block relocation information packet begins with a zero marker 161 and ends with a zero marker 172. In block relocation code 162 and 171, located adjacent to zero markers 161 and 172, respectively, is provided to indicate that the marker 160 provides block relocation information. The address of the last block is provided at 163 and 169, which corresponds to the address for the last block of good data. The address of the next good data is provided in the next block marker 164 and 170. The value for the data offset in the last data block is provided at 165 and the offset for the next good data is provided with marker 166. The previous byte count is indicated with marker 167 and the number of bytes in the next block of data is indicated at 168.

Figure 7:
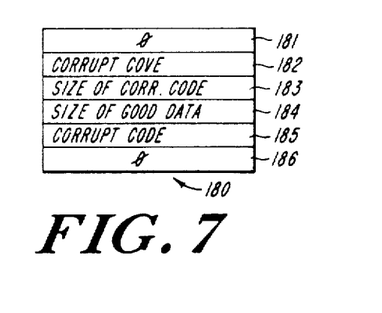
FIG. 7 is a block diagram of one embodiment of a corrupt data IP in accordance with the present invention.

An information packet 180 identifies records which were corrupted by a magnetic tape format erase command, as illustrated in Table 1, or particularly by other data alteration or corruption, such as shown in FIG. 7. The corrupted data information packet 180 begins and ends with the zero bytes 181 and 186, respectively. A selected code 182 serves to indicate that this information packet, delineated by the zero byte markers 181 and 186 indicates the existence of corrupt data. The total number of data entries, or record size is indicated as a combination of the size of corrupted data, indicated by the value of bytes 183 plus the size of the good data indicated by the value of bytes 184. The corrupt code 182 is repeated at 185 before the zero bytes 186.

Figure 8:
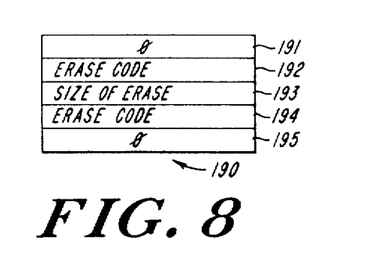
FIG. 8 is a block diagram of one embodiment of an erase IP in accordance with the present invention.
Figure 9:
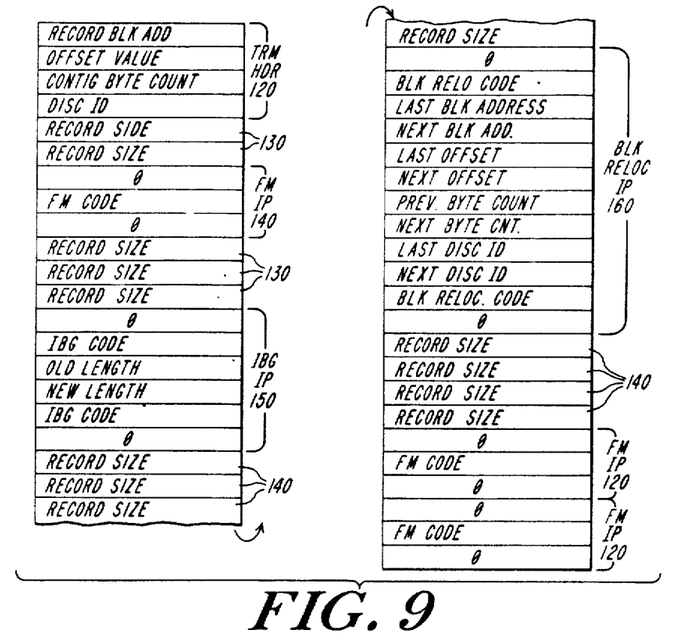
FIG. 9 is a first illustration of a TRM in accordance with the present invention.

The magnetic tape format erase command of Table 1 is translated into an erase information packet 190 in FIG. 8. The erase information packet begins and ends [with zero bytes 191 and 195, respectively. A selected erase code is provided by bytes 192 and 194. The number of bytes erased is indicated by the size of erase quantity in bytes 193.

Figure 10:
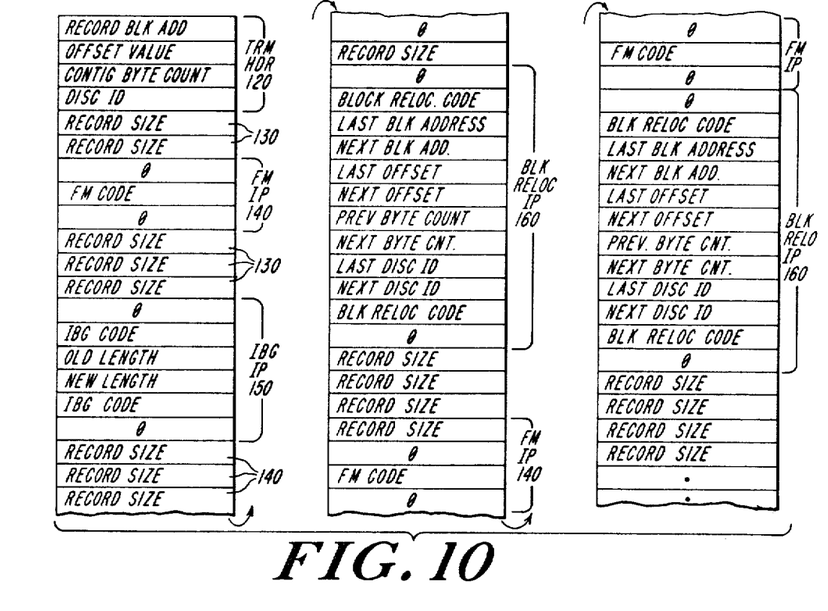
FIG. 10 is a second illustration of a TRM in accordance with the present invention.

The TRM, discussed above, is created by a combination of the above-discussed information packets to reflect the magnetic tape format commands and the data transfers effected between the buffers 62 and 64, and the WORM disk drive 70. The data to be written on the WORM disk 72 is sent by the host computer 54 and stored in the data buffer 62 and the record size 130 is recorded in the TRM following the header 120. An example is provided in FIG. 10. The various informational packets are used to record the non-data information sent by the host computer 54 and the action during the data storage process, as discussed above. The example provided in FIG. 10 illustrates an application of the various information packets of FIGS. 3–8 discussed above. When the TRM data buffer contains enough data to fill the minimum disk drive 70 block (typically 1K byte), the data is written from the pseudotape buffer to the disk. If a bad disk 72 block is encountered by the disk drive 72, the reformatter controller will cause the data block to be relocated to a good disk block and the block relocation information marker illustrated in FIG. 9 as 160, will mark the relocation in the TRM before it is written to the optical disk 72. When the TRM fills to the capacity of one disk block, it is then written to the disk, and the block address is recorded in the TRML 76 as part of the directory 74.

When an "editing" function takes place, a new TRM is necessary. The changed data needs to be located in a non-contiguous block and the block relocation information packet 160 is used to provide data continuity as illustrated in FIG. 10. When a magnetic tape format read or search command is received by the host computer 54, an address pointer is used to move forward or backward in the pseudotape buffer (TRM). As the record sizes are stored in the TRM itself, the current record address on the disk 72 is calculated as an offset from the last known block address in the TRM. Any alteration of the pre-written data requires a new TRM. However, the new TRM address needs to be updated in the TRML. Therefore, a new TRML and a new directory is created.

Figure 11:
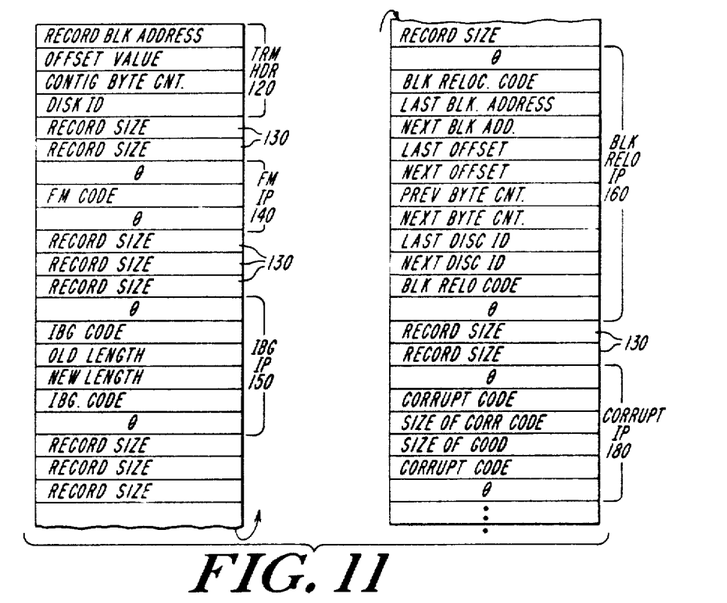
FIG. 11 is a third illustration of a TRM in accordance with the present invention.

Illustrations of the application of a corrupt data information packet 180 and an erase information packet 190 in the TRM is provided in FIGS. 11 and 12, respectively.

Therefore, according to the data structures generated by the system and apparatus of the present invention, all data and information corresponding to a magnetic tape data format is retained and stored on a storage medium which can be returned to the host system in the same magnetic tape format by reconfiguring the stored information in the magnetic tape data format without loss of information. Moreover, in the above-described embodiment, the storage medium comprises a permanent, non-erasable optical disk, which in combination with the other elements of the present invention, emulates the erasability of a conventional magnetic tape. Furthermore, it is envisioned that the present invention can be applied to other computer output and storage media formats which will be provided to an erasable or non-erasable medium. Therefore, modifications and substitutions to various components of the present invention, and to the particular codes and the storage device (70), are within the scope of the present invention, which is not to be limited except by the claims which follows.

What is claimed is:

1. Apparatus for storing data from a first format in a storage media having a second data format according to external control signals wherein said second data format comprises a sequentially addressable space having a first end and a second end selected from the maximum and minimum address value of said sequentially addressable space comprising:
   means for storing first format data blocks and having a maximum capacity;
   means for storing a record map including information packet associated with said first format data blocks and having a maximum capacity wherein said information packet includes at least one of a record map header, a file mark, an inter block gap, a block relocation, a corrupted data and an erase data information packet;
   control means for directing the transfer of data to said storage media in sequence beginnings at the first available location from said first end, and for directing the transfer of non-data information to said storage media in sequence beginning at the first available location from said first location, wherein said data and non-data information are interspersed on said storage media; and
   address means for generating and storing on said media beginning at the first available location from said second end, the storage medium address wherein said data and said non-data related information are stored;
   said control means includes means for generating a record map, said record map comprising a plurality of said information packets, comprising at least one of:
      said record map header including a recording block address code, an offset value, a contiguous byte count and a disk identifier;
      said corrupt data information packet having a corrupt code, size of corrugated data and size of good data code;
      said erase data information packet having an erase data code and a size of erase data code corresponding to the number of data entries; and
      said block relocation information packet having a block relocation code, a last block address code, a next block address code, a last offset code, a next offset code, a previous byte count code, a next byte count code, a last disk identification code, and a next disk identification code, wherein
   said media units comprise write-once read-many optical disks.

2. The apparatus of claim 1 wherein
said address means includes means for generating and storing on said media a high level directory beginning at the first available location from said second end, said high level directory identifying a record map list corresponding to the storage media address wherein said data and said non-data related information are stored.

3. The apparatus of claim 2, further including:
means for transferring said data and said tape record map from said storage medium in said first format according to said external control signals.

4. The apparatus of claim 3, wherein
said means for transferring includes said first means for storing, said second means for storing and said control means.

5. The apparatus of claim 1, wherein
each said code comprises a contiguous 2-byte binary code.

6. The apparatus of claim 1, wherein
said first format comprises a magnetic tape data format.

7. The apparatus of claim 6, wherein
said address generating and storing means includes directory generating means including means for generating an address code for storage on said medium, the address code corresponding to an identified reel of magnetic tape.

8. The apparatus of claim 1, wherein:
said address generating and storing means includes directory generating means including means for generating a record map list having means for generating a record map address code for each record map in the corresponding directory, a present media unit identification code and a next media unit identification code different from said present media unit identification code for data addressed within the directory, wherein said next media unit is subsequently associated with said apparatus for storing data.

9. A method of translating data from a first format having sequential data blocks and block associated information interspersed between said sequential data blocks to a media having second addressable random access format, comprising the steps of:
storing the data blocks in a data buffer;
electronically generating a record map of the data stored in the data buffer stored in a record buffer;
repeating the steps of storing the data blocks and generating a record map until said data buffer and said record buffer are full;
electronically transferring the data and the record map from the respective full buffers to said media;
electronically generating a record map list having the media address of the stored data and record map;
electronically generating a directory referencing at least one record map list; and
storing said directory and said record map list on said media; wherein:
said media comprises a serial media having a first and a second end selected from the beginning and end of said serial media;
said step of electronically transferring comprises transferring to a first end of said media subsequent to any data and record maps previously transferred; and
said step of storing said record map list comprising the steps of storing said record map list at said second end subsequent to any previously stored record map lists;
said first format comprises magnetic tape format;
said block associated information includes data block gaps and file marks, said method further including the steps of
generating secondary information related to said block associated information; and
storing said secondary information in said record map.

10. A method of translating data from a first format having sequential data blocks and block associated information interspersed between said sequential data blocks to a media having second addressable random access format, comprising the steps of:
storing the data blocks in a data buffer; electronically generating a record map of the data stored in the data buffer stored in a record buffer;
repeating the steps of storing the data blocks and electronically generating a record map until said data buffer and said record buffer are full;
transferring the data and the record map from the respective full buffers to said media;
electronically generating a record map list having the media address of the stored data and record map;
electronically generating a directory referencing at least one record map list; and
storing said directory and said record map list on said media wherein:
said media comprises a serial media having a first and a second end selected from the beginning and end of said serial media;
said step of transferring comprises transferring to a first end of said media subsequent to any data and record maps previously transferred;
said step of storing said record map list comprising the steps of storing said record map list at said second end subsequent to any previously stored record map lists; and
said step of generating a record map includes at least one of the steps of:
generating a record block address;
generating an offset value;
generating a record size value; and
generating a media identification number.

* * * * *

UNITED STATES PATENT AND TRADEMARK OFFICE
CERTIFICATE OF CORRECTION

PATENT NO. : 4,947,367
DATED : August 7, 1990
INVENTOR(S) : Christopher Y. Chang and Leo C. Sherwin It is certified that error appears in the above-identified patent and that said Letters Patent is hereby corrected as shown below:

On the title page, item [54], lines 1-8, and column 1, lines 1-7 the title should read --SYSTEM FOR CONVERTING DIGITAL DATA FROM MAGNETIC TAPE FORMAT TO WORM OPITCAL DISK FORMAT--.

In Figure 1, in the data buffer 62, "BYJE" should read --BYTE--.

Column 3, line 63, "controlld" should read --controlled--.

Column 4, line 10, "The reformattor" should read --The reformatter--.

Column 5, line 5, "Present" should read --present--.

Column 6, line 61, "[with" should read --with--.

Column 8, line 29, "including a recording" should read --including a record--.

Column 8, line 33, "size of corrugated data" should read --size of corrupted data--.

Signed and Sealed this

Eleventh Day of August, 1992

Attest:

DOUGLAS B. COMER

Attesting Officer     Acting Commissioner of Patents and Trademarks